(12) United States Patent
Cooper

(10) Patent No.: US 12,274,216 B1
(45) Date of Patent: Apr. 15, 2025

(54) PLANT SUPPORT APPARATUS

(71) Applicant: Jack Cooper, Monmouth, OR (US)

(72) Inventor: Jack Cooper, Monmouth, OR (US)

( * ) Notice: Subject to any disclaimer, the term of this patent is extended or adjusted under 35 U.S.C. 154(b) by 0 days.

(21) Appl. No.: 18/377,997

(22) Filed: Oct. 9, 2023

(51) Int. Cl.
*A01G 9/12* (2006.01)

(52) U.S. Cl.
CPC ........................................ *A01G 9/12* (2013.01)

(58) Field of Classification Search
CPC .......... A01G 9/12; A01G 9/122; A01G 22/05; A47G 7/025
See application file for complete search history.

(56) References Cited

U.S. PATENT DOCUMENTS

| | | | |
|---|---|---|---|
| 3,088,245 A * | 5/1963 | Menge | A01G 9/12 47/47 |
| 4,858,380 A * | 8/1989 | Gayle | A01G 13/0243 47/32.4 |
| 4,914,857 A * | 4/1990 | Dodgen | A01G 9/12 248/156 |
| 5,595,019 A | 1/1997 | Foreman | |
| D378,287 S * | 3/1997 | Alligood | D11/143 |
| 5,848,522 A * | 12/1998 | Coviello, Jr. | A01D 46/26 47/32.4 |
| 6,874,276 B2 | 4/2005 | Morrison | |
| 6,895,712 B2 | 5/2005 | Gunderman | |
| 7,043,876 B2 | 5/2006 | LaPelusa | |
| 8,341,879 B1 * | 1/2013 | Rinehart | A01G 9/12 47/45 |
| 10,334,792 B2 | 7/2019 | Fakhari | |
| D878,879 S | 3/2020 | Blackketter | |
| 2004/0237393 A1 * | 12/2004 | Morrison | A01G 9/12 47/45 |
| 2022/0061231 A1 | 3/2022 | Fahey | |
| 2022/0312688 A1 | 10/2022 | Choe | |

FOREIGN PATENT DOCUMENTS

| | | | |
|---|---|---|---|
| GB | 2423912 | 9/2006 | |
| SE | 201150618 A1 * | 1/2013 | ......... A01G 13/0243 |

* cited by examiner

*Primary Examiner* — Kristen C Hayes

(57) ABSTRACT

A plant support apparatus for maintaining plant material above soil includes a basket with a perimeter wall. An upper edge of the perimeter wall defines an upper opening, and a lower edge of the perimeter wall defines a lower opening. The perimeter wall is angled inwardly from the upper edge to the lower edge. A plurality of legs is coupled to and extends downwardly from the basket.

19 Claims, 11 Drawing Sheets

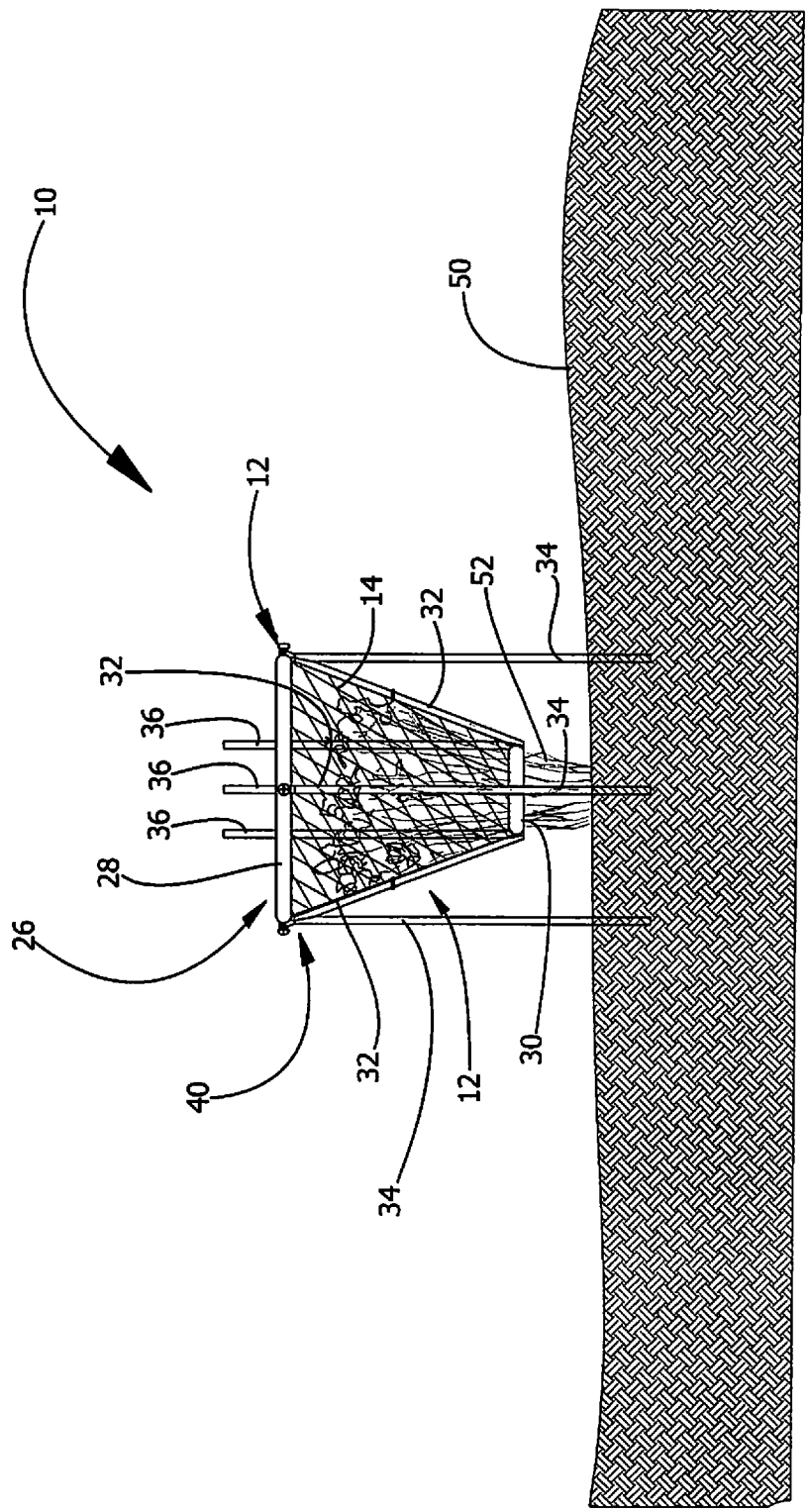

PLANT SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to plant support apparatuses and more particularly pertains to a new plant support apparatus for maintaining plant material above soil.

(2) Description of Related Art Including Information Disclosed Under 37 CFR 1.97 and 1.98

The prior art relates to plant support apparatuses which rely primarily on wire-form structures for vines to grow against in an interlocking fashion or which prop up branches for trees or similar plants. However, the prior art fails to disclose a plant support apparatus which is positionable in soil around the plant and comprises a barrier spaced above the soil to prevent fruit or other plant matter from contacting the soil.

BRIEF SUMMARY OF THE INVENTION

An embodiment of the disclosure meets the needs presented above by generally comprising a basket with a perimeter wall. An upper edge of the perimeter wall defines an upper opening, and a lower edge of the perimeter wall defines a lower opening. The perimeter wall is angled inwardly from the upper edge to the lower edge. A plurality of legs is coupled to and extends downwardly from the basket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 13 is an in-use view of an embodiment of the disclosure.

DETAILED DESCRIPTION OF THE INVENTION

Figure 1:
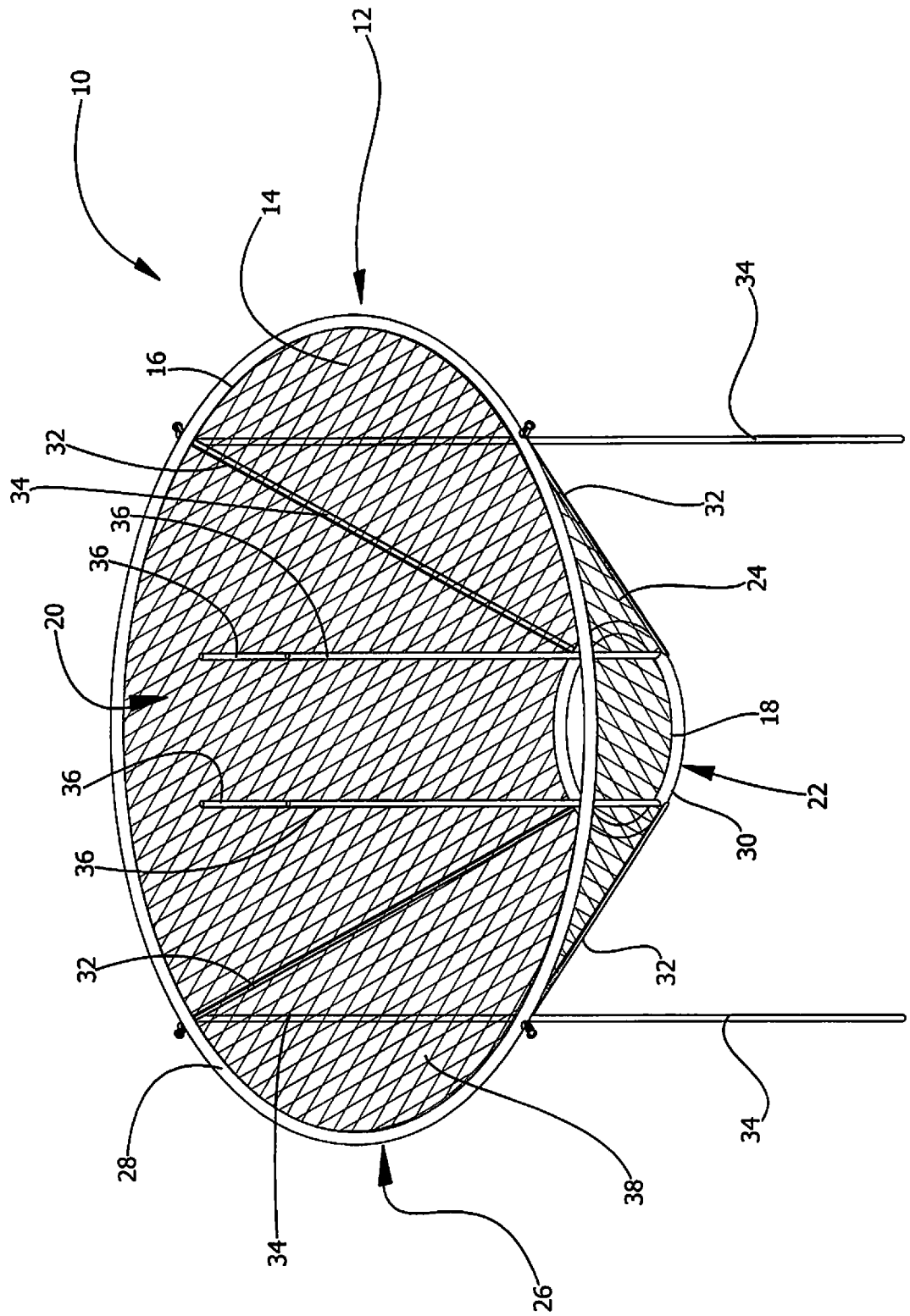
FIG. 1 is a top perspective view of a plant support apparatus according to an embodiment of the disclosure.
Figure 2:
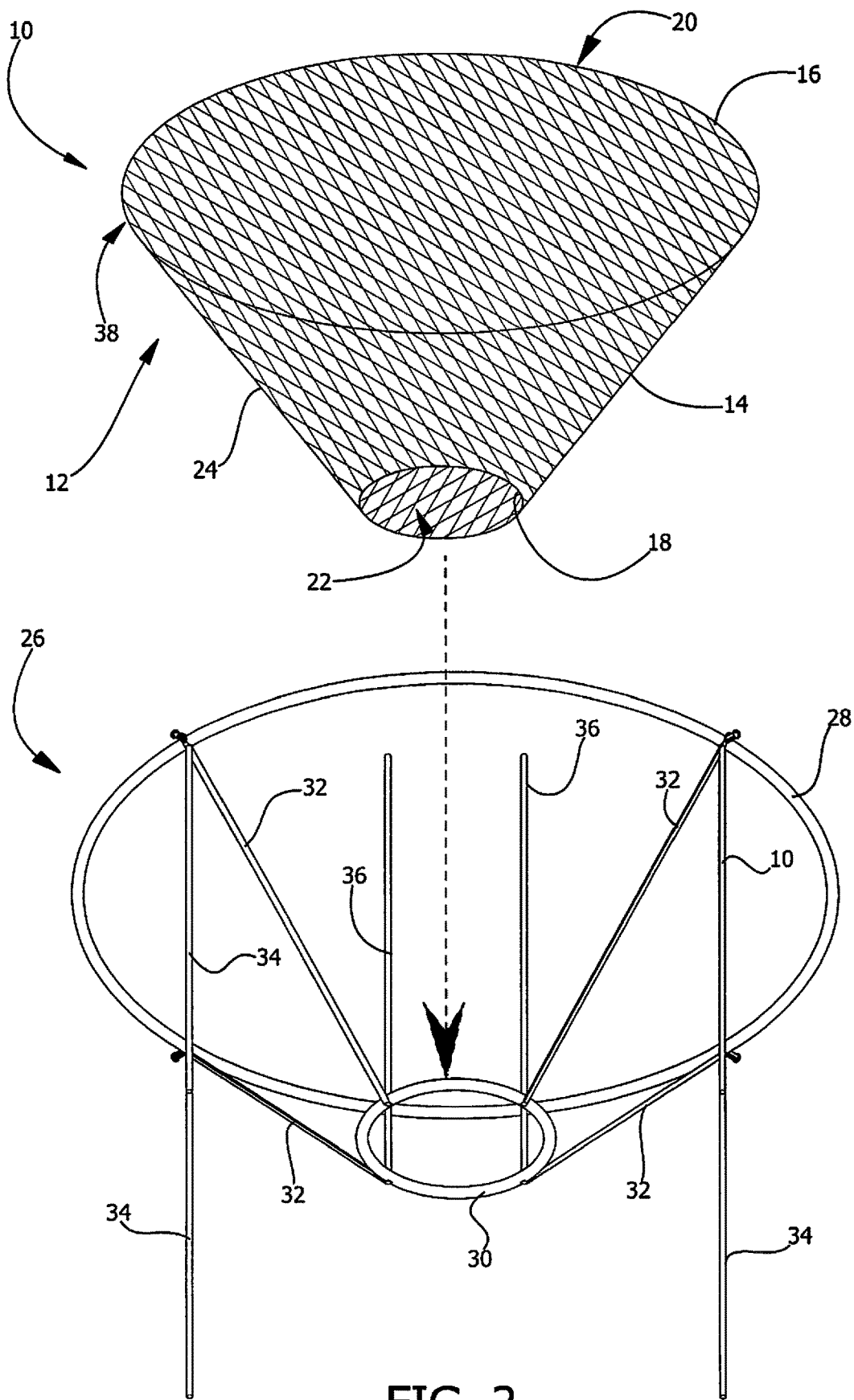
FIG. 2 is an exploded bottom perspective view of an embodiment of the disclosure.
Figure 3:
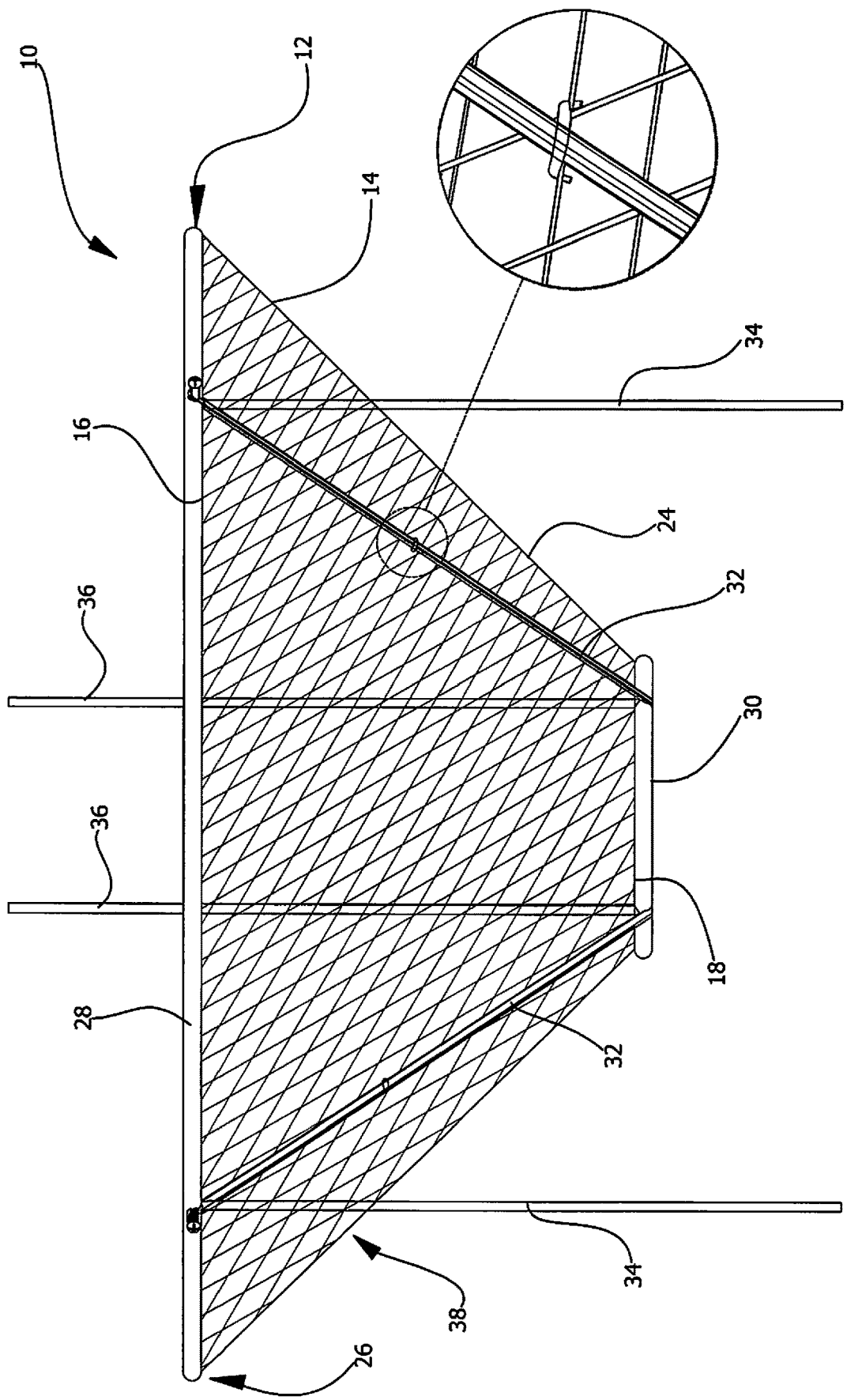
FIG. 3 is a front view of an embodiment of the disclosure.
Figure 4:
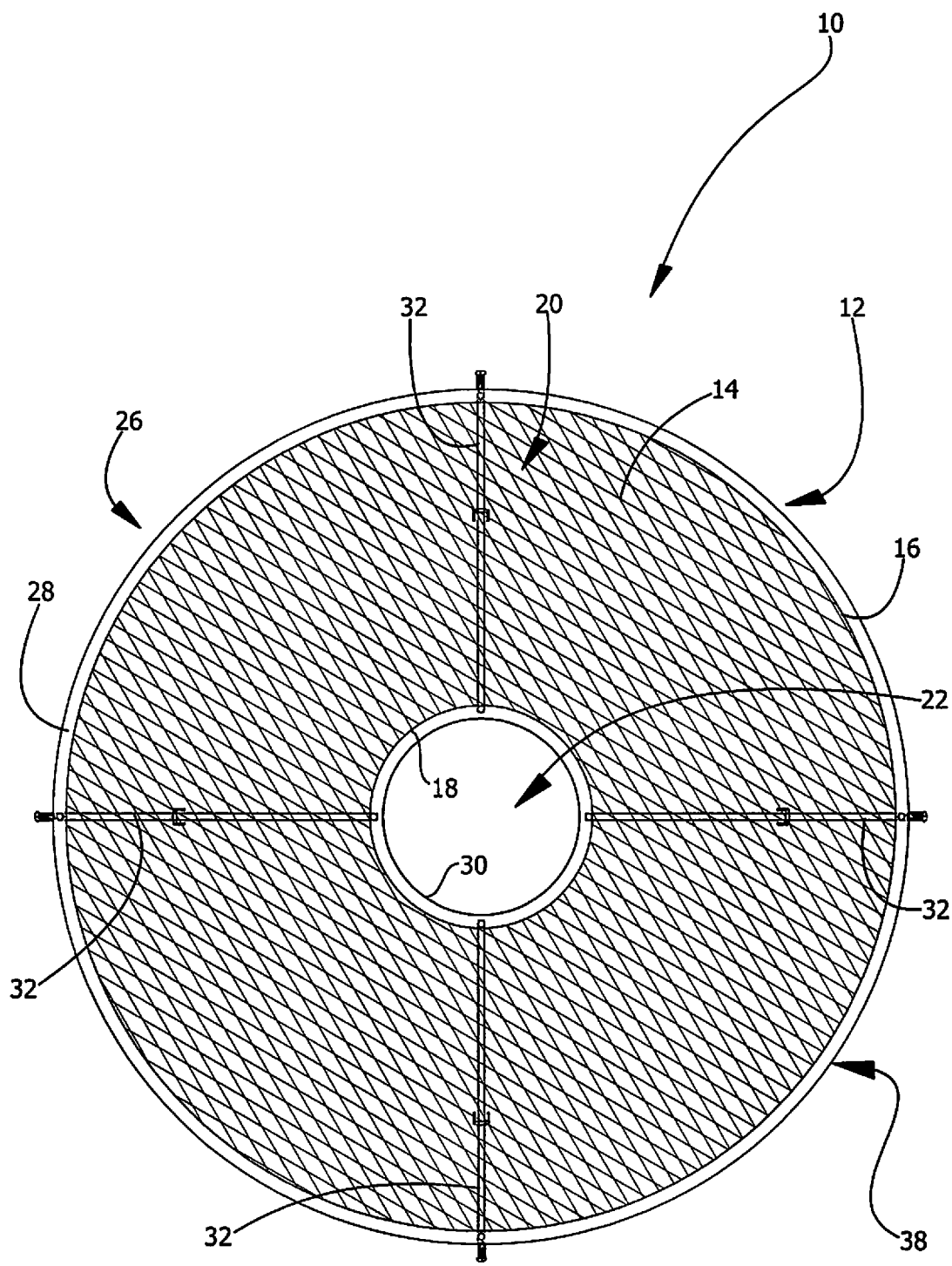
FIG. 4 is a top view of an embodiment of the disclosure.
Figure 5:
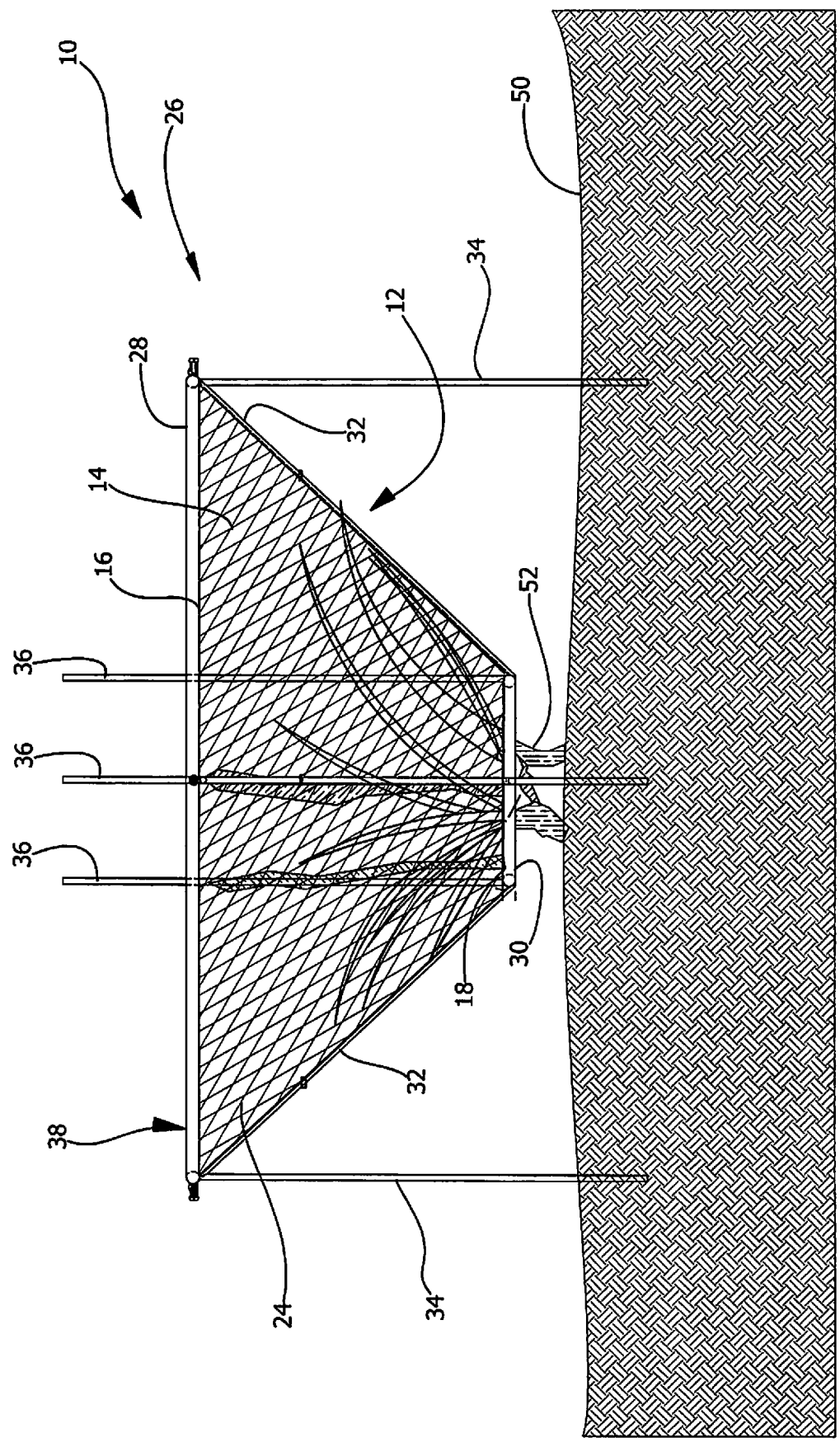
FIG. 5 is an in-use view of an embodiment of the disclosure.
Figure 6:
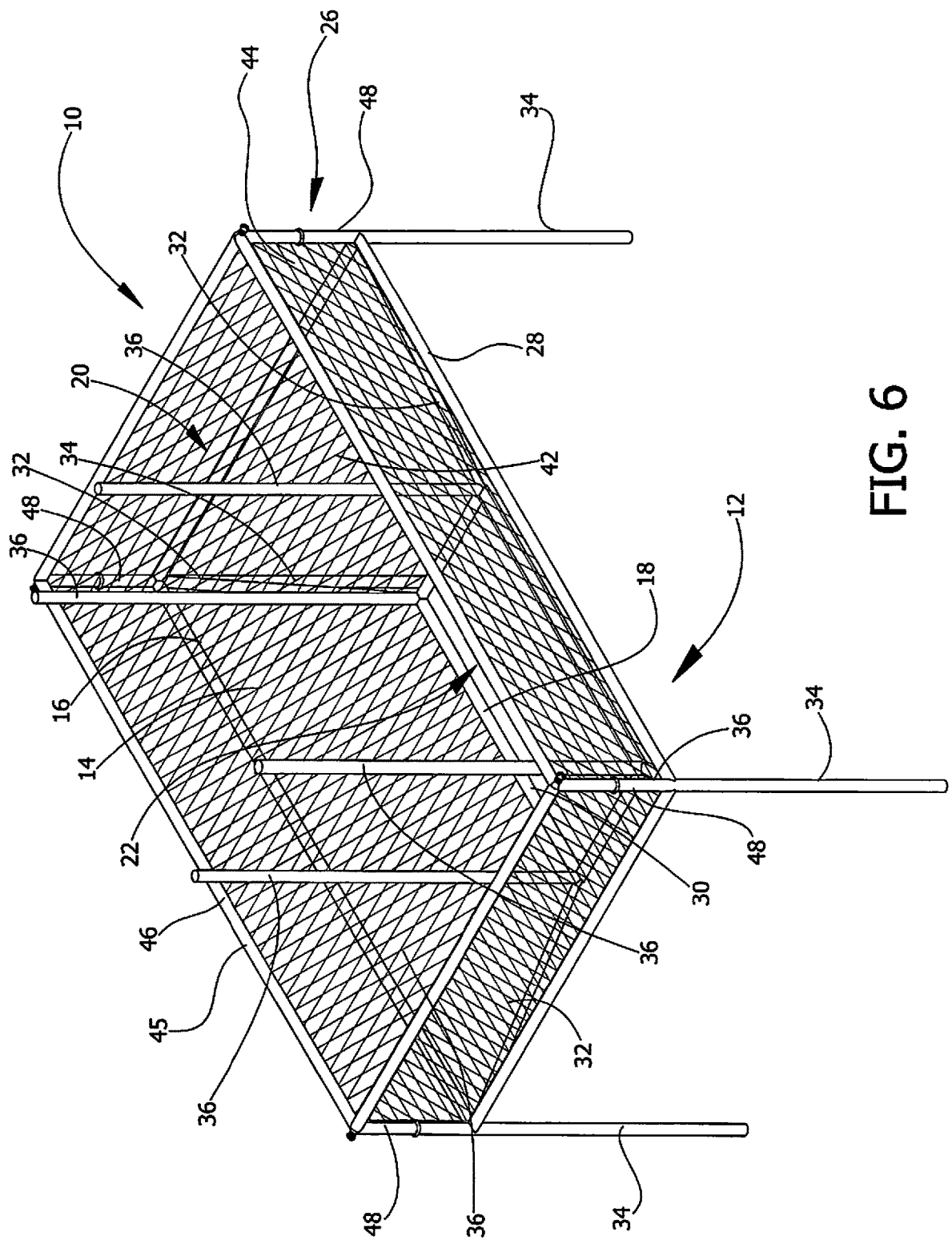
FIG. 6 is a top perspective view of an embodiment of the disclosure.
Figure 7:
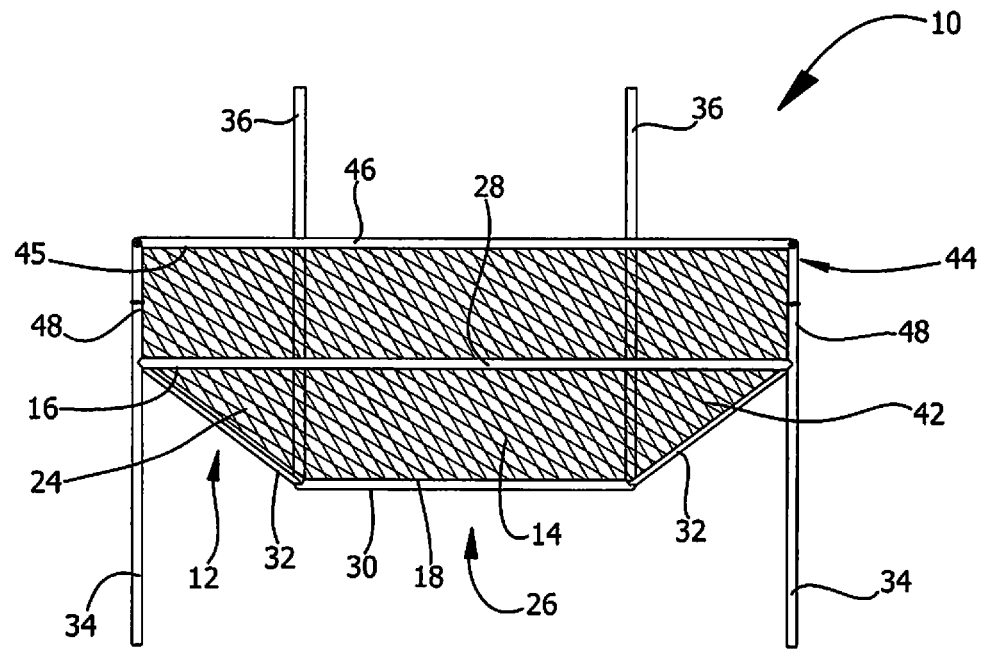
FIG. 7 is a front view of an embodiment of the disclosure.
Figure 8:
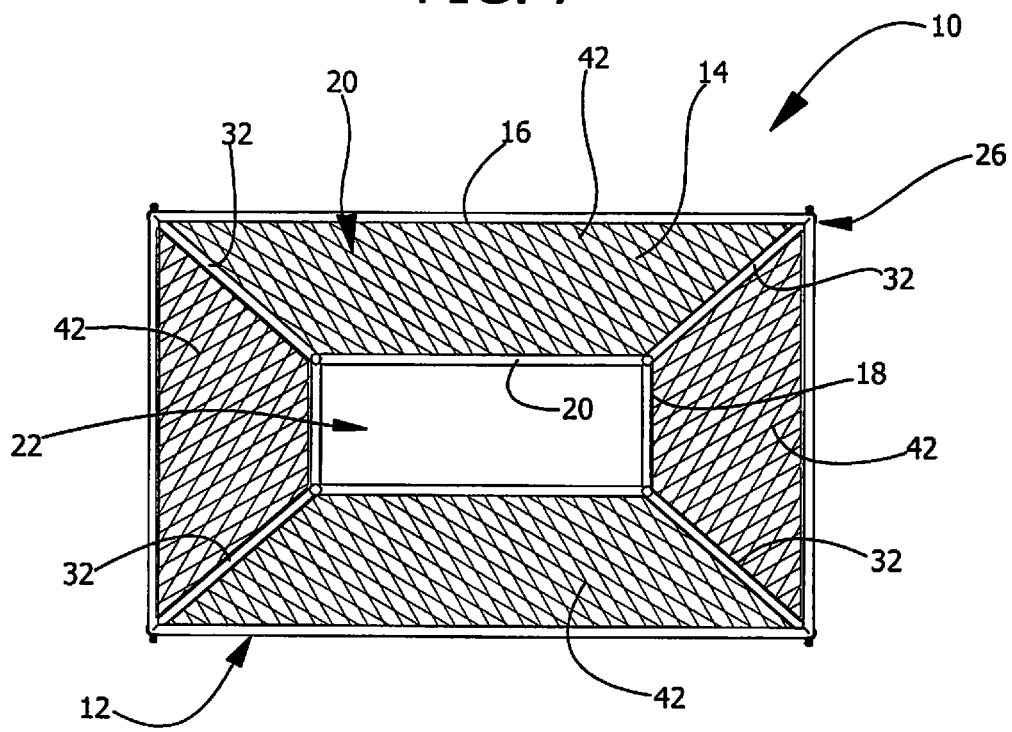
FIG. 8 is a top view of an embodiment of the disclosure.
Figure 9:
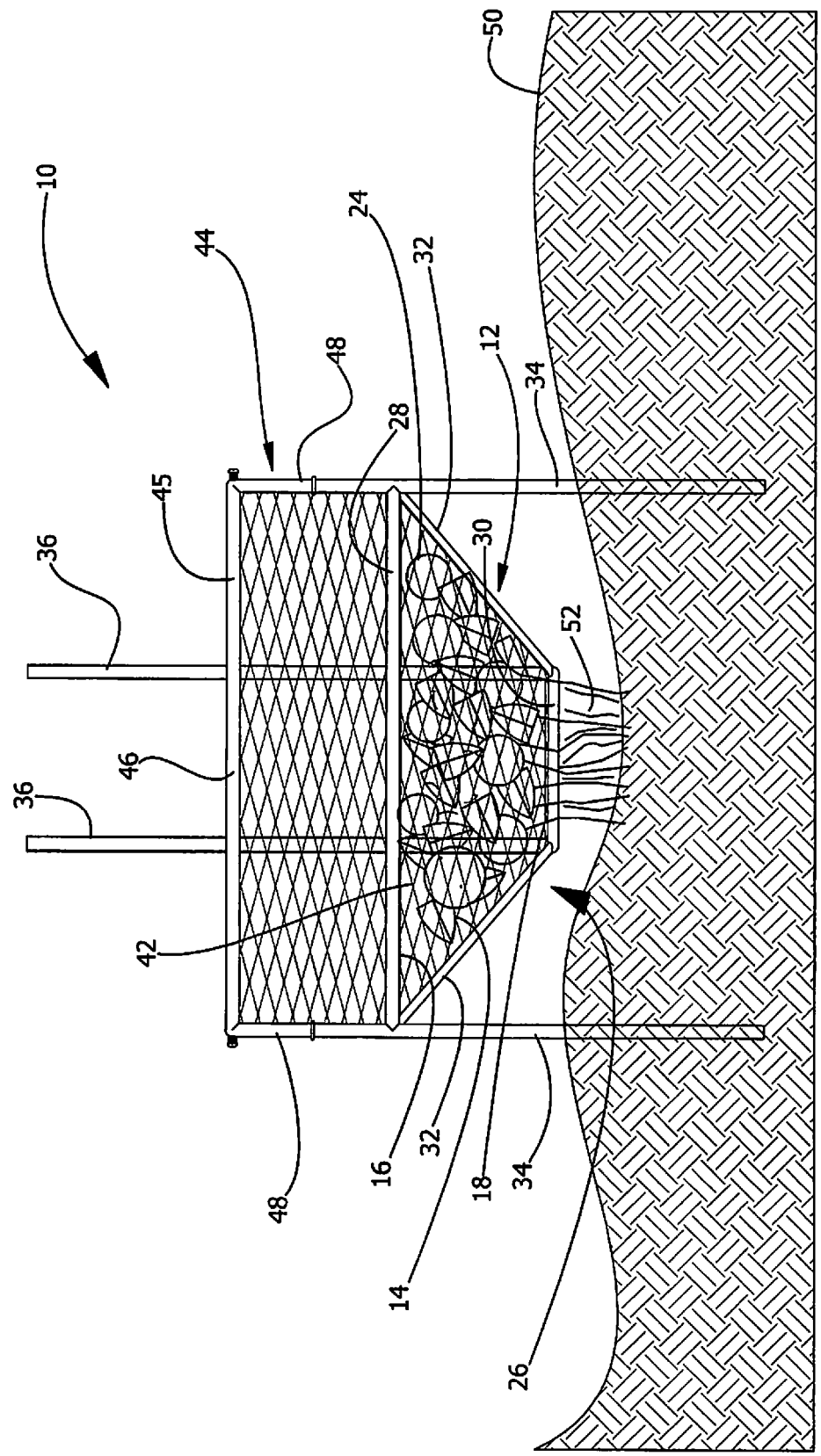
FIG. 9 is an in-use view of an embodiment of the disclosure.
Figure 10:
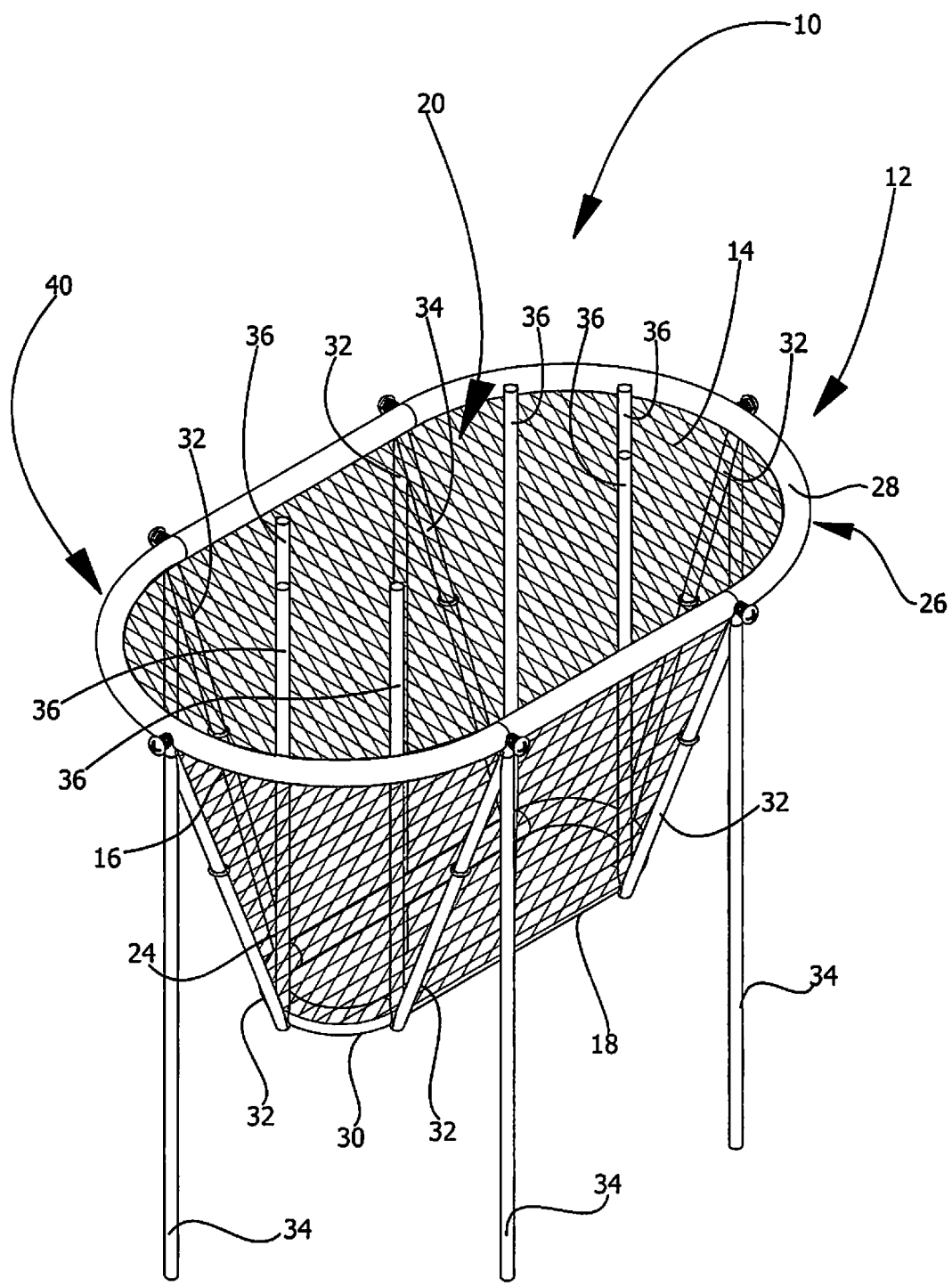
FIG. 10 is a perspective view of an embodiment of the disclosure.
Figure 11:
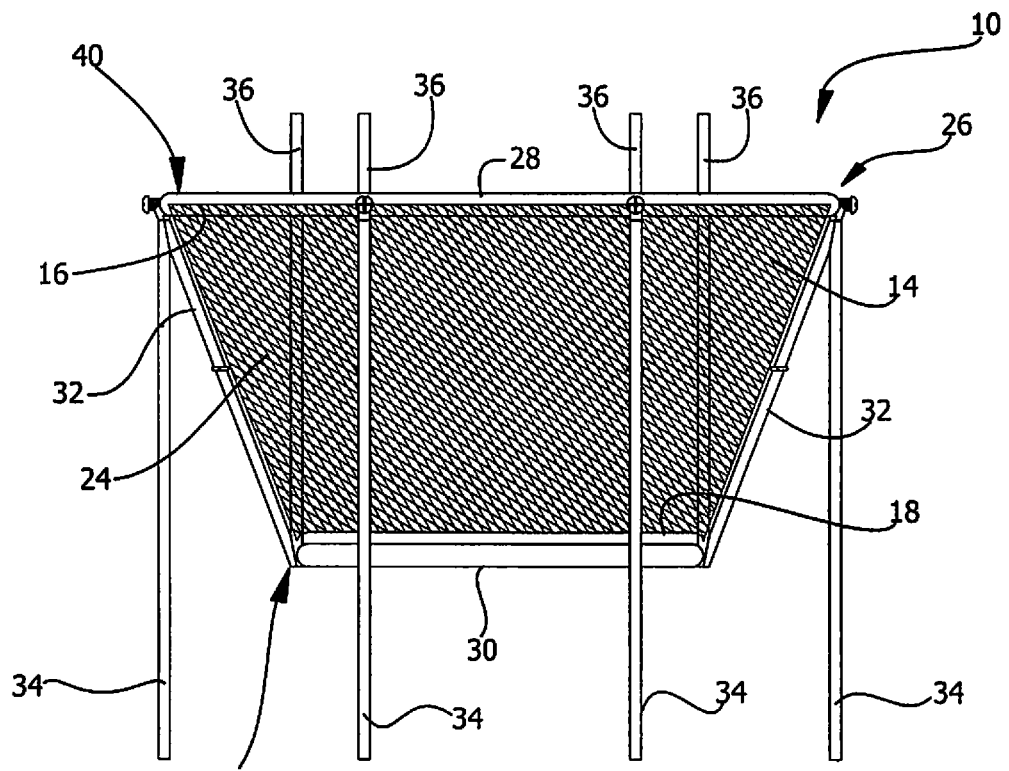
FIG. 11 is a front view of an embodiment of the disclosure.
Figure 12:
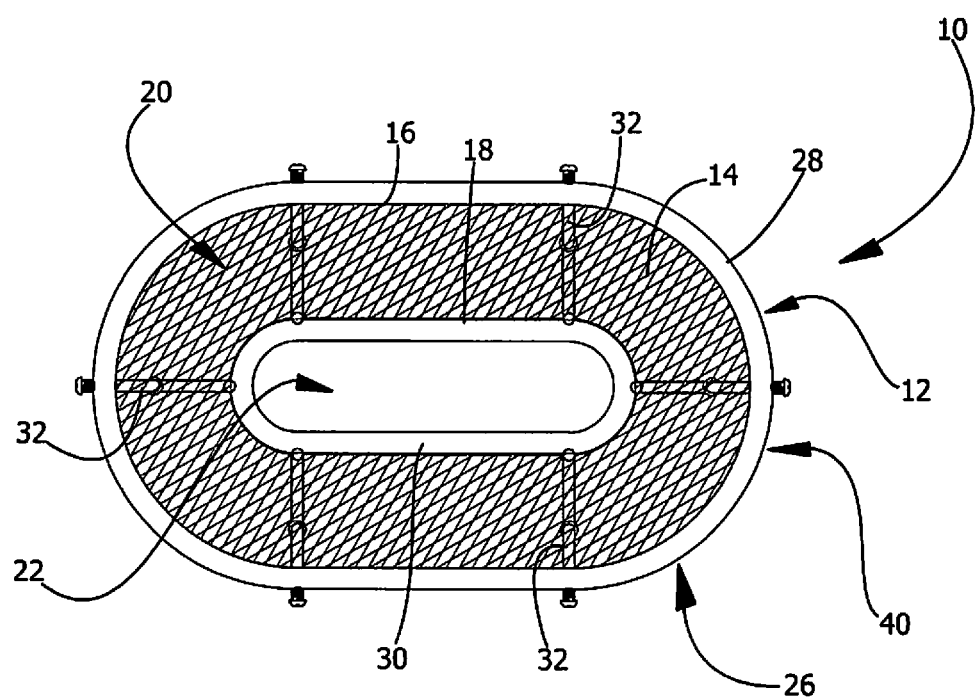
FIG. 12 is a top view of an embodiment of the disclosure.

With reference now to the drawings, and in particular to FIGS. 1 through 13 thereof, a new plant support apparatus embodying the principles and concepts of an embodiment of the disclosure and generally designated by the reference numeral 10 will be described.

As best illustrated in FIGS. 1 through 13, the plant support apparatus 10 generally comprises a basket 12 with a perimeter wall 14 and a framework 26 for supporting the perimeter wall 14. An upper edge 16 of the perimeter wall 14 defines an upper opening 20, and a lower edge 18 of the perimeter wall 14 defines a lower opening 22. The perimeter wall 14 is angled inwardly from the upper edge 16 to the lower edge 18. The perimeter wall 14 is porous to allow air and water to flow freely through the perimeter wall 14. The perimeter wall 14 comprises meshed wiring, but may comprise perforated sheet metal, fabric, a polymer, or the like.

The framework 26 is coupled to an exterior 24 of the perimeter wall 14. The framework 26 comprises an upper rim 28, a lower rim 30, and a plurality of cross members 32. The upper rim 28 extends along an entirety of the upper edge 16 of the perimeter wall 14, the lower rim 30 extends along an entirety of the lower edge 18 of the perimeter wall 14, and each cross member 32 of the plurality of cross members 32 is coupled to and extends between the upper rim 28 and the lower rim 30.

A plurality of legs 34 is coupled to and extends downwardly from the basket 12. Each leg 34 of the plurality of legs 34 is coupled to the upper rim 28 of the framework 26, but may be coupled to the lower rim 30, an associated one of the plurality of cross members 32, or elsewhere. The legs 34 are evenly spaced along the upper rim 28. Each leg 34 of the plurality of legs 34 comprises a plastically bendable material such that the leg 34 retains a selected shape. The plastically bendable material comprises a metal wire but may comprise a polymer or other suitable material.

A plurality of columns 36 is coupled to and extends upwardly from the basket 12. The columns 36 are positioned on the lower rim 30 of the framework 26 and are evenly spaced along the lower rim 30. The columns 36 facilitate the vertical growth of vines or other climbing plants which interlock with and gain support from structures.

In reference to FIGS. 1 through 5, the perimeter wall 14 of a first embodiment of the plant support apparatus 10 has a circular conical shape 38. As shown in FIGS. 10 through 13, the perimeter wall 14 of a second embodiment of the plant support apparatus 10 has an elliptic conical shape 40.

FIGS. 6 through 9 illustrate a third embodiment of the plant support apparatus 10 in which the perimeter wall 14 comprises a plurality of trapezoidal portions 42 such that the lower opening 22 and the upper opening 20 have rectangular shapes. The basket 12 of the third embodiment further comprises a barrier which is coupled to and extends upwardly from the upper edge 16 of the perimeter wall 14. The barrier 44 extends along the entirety of the upper edge 16. Similar to the perimeter wall 14, the barrier 44 is porous and comprises the meshed wiring, though the barrier 44 also may comprise perforated sheet metal, fabric, a polymer, or the like. The barrier 44 is integrally formed with the perimeter wall 14 but may be separately constructed. The framework 26 extends around the barrier 44 and further comprises a barrier rim 46 and a plurality of posts 48. The barrier rim 46 extends along an entirety of a top edge 45 of the barrier 44, and each post 48 of the plurality of posts 48 is coupled to and extends between the barrier rim 46 and the upper rim 28. Other embodiments may also include barriers which extend upwardly from the perimeter wall 14 similar to the barrier 44 included in the third embodiment.

In use, the plant support apparatus 10 is supported over soil 50 in which one or more plants 52 have been planted. The legs 34 insert into the soil 50 but may rest atop the soil 50. The legs 34 may be bent into selected shapes for various purposes, such as avoiding obstacles or improving the stability of the plant support apparatus 10 by spreading the legs 34 outwardly from the basket 12. Fruit and other plant material of the one or more plants 52 is prevented from contacting the ground by the perimeter wall 14 of the basket 12. Water freely drains through the perimeter wall 14 and gases freely flow through the perimeter wall 14 so as not to impede respiration of the one or more plants 52. The perimeter wall 14 also does not impede photosynthesis of the one or more plants 52 by permitting sunlight to shine through the perimeter wall 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant support apparatus comprising:
    a basket comprising a perimeter wall, an upper edge of the perimeter wall defining an upper opening, a lower edge of the perimeter wall defining a lower opening, the perimeter wall being angled inwardly from the upper edge to the lower edge;
    a plurality of legs being coupled to and extending downwardly from the basket; and
    a plurality of columns being coupled to and extending upwardly from the basket.

2. The apparatus of claim 1, wherein the perimeter wall is porous.

3. The apparatus of claim 2, wherein the perimeter wall comprises meshed wiring.

4. The apparatus of claim 1, wherein the basket further comprises a framework coupled to an exterior of the perimeter wall, the framework comprising an upper rim, a lower rim, and a plurality of cross members, the upper rim extending along an entirety of the upper edge of the perimeter wall, the lower rim extending along an entirety of the lower edge of the perimeter wall, each cross member of the plurality of cross members being coupled to and extending between the upper rim and the lower rim.

5. The apparatus of claim 4, wherein each leg of the plurality of legs is coupled to the upper rim of the framework.

6. The apparatus of claim 5, wherein the legs of the plurality of legs are evenly spaced along the upper rim.

7. The apparatus of claim 1, wherein each leg of the plurality of legs comprises a plastically bendable material such that the leg retains a selected shape.

8. The apparatus of claim 7, wherein the plastically bendable material comprises a metal wire.

9. The apparatus of claim 1, wherein the plurality of columns is positioned on the lower rim of the framework, the plurality of columns being evenly spaced along the lower rim.

10. The apparatus of claim 1, wherein the perimeter wall has a circular conical shape.

11. The apparatus of claim 1, wherein the perimeter wall has an elliptic conical shape.

12. The apparatus of claim 1, wherein the perimeter wall comprises a plurality of trapezoidal portions such that the lower opening and the upper opening have rectangular shapes.

13. The apparatus of claim 1, wherein the basket further comprises a barrier, the barrier being coupled to and extending upwardly from the upper edge of the perimeter wall, the barrier extending along the entirety of the upper edge, the barrier being porous, the barrier comprising the meshed wiring.

14. The apparatus of claim 13, wherein the barrier is integrally formed with the perimeter wall.

15. A plant support apparatus comprising:
a basket comprising a perimeter wall, an upper edge of the perimeter wall defining an upper opening, a lower edge of the perimeter wall defining a lower opening, the perimeter wall being angled inwardly from the upper edge to the lower edge;
a plurality of legs being coupled to and extending downwardly from the basket;
wherein the basket further comprises a barrier, the barrier being coupled to and extending upwardly from the upper edge of the perimeter wall, the barrier extending along the entirety of the upper edge, the barrier being porous, the barrier comprising the meshed wiring; and
wherein the framework extends around the barrier, the framework further comprising:
   a barrier rim, the barrier rim extending along an entirety of a top edge of the barrier; and
   a plurality of posts, each post of the plurality of posts being coupled to and extending between the barrier rim and the upper rim.

16. A plant support apparatus comprising:
a basket comprising:
   a perimeter wall, an upper edge of the perimeter wall defining an upper opening, a lower edge of the perimeter wall defining a lower opening, the perimeter wall being angled inwardly from the upper edge to the lower edge, the perimeter wall being porous, the perimeter wall comprising meshed wiring; and
   a framework being coupled to an exterior of the perimeter wall, the framework comprising an upper rim, a lower rim, and a plurality of cross members, the upper rim extending along an entirety of the upper edge of the perimeter wall, the lower rim extending along an entirety of the lower edge of the perimeter wall, each cross member of the plurality of cross members being coupled to and extending between the upper rim and the lower rim;
a plurality of legs being coupled to and extending downwardly from the basket, each leg of the plurality of legs being coupled to the upper rim of the framework, the plurality of legs being evenly spaced along the upper rim, each leg of the plurality of legs comprising a plastically bendable material such that the leg retains a selected shape, the plastically bendable material comprising a metal wire;
a plurality of columns being coupled to and extending upwardly from the basket, the plurality of columns being positioned on the lower rim of the framework, the plurality of columns being evenly spaced along the lower rim.

17. The apparatus of claim 16, wherein the perimeter wall has a circular conical shape.

18. The apparatus of claim 16, wherein the perimeter wall has an elliptic conical shape.

19. The apparatus of claim 16, wherein:
the perimeter wall comprises a plurality of trapezoidal portions such that the lower opening and the upper opening have rectangular shapes;
the basket further comprises a barrier, the barrier being coupled to and extending upwardly from the upper edge of the perimeter wall, the barrier extending along the entirety of the upper edge, the barrier being porous, the barrier comprising the meshed wiring, the barrier being integrally formed with the perimeter wall; and
the framework extends around the barrier, the framework further comprising:
   a barrier rim, the barrier rim extending along an entirety of a top edge of the barrier; and
   a plurality of posts, each post of the plurality of posts being coupled to and extending between the barrier rim and the upper rim.

\* \* \* \* \*